US012583434B2

(12) United States Patent
Yun et al.

(10) Patent No.: US 12,583,434 B2
(45) Date of Patent: Mar. 24, 2026

(54) METHOD OF CONTROLLING HYBRID ELECTRIC VEHICLE

(71) Applicants:Hyundai Motor Company, Seoul (KR); Kia Corporation, Seoul (KR)

(72) Inventors: Sok Young Yun, Gyeonggi-do (KR); Min Kyu Lee, Seoul (KR); Kyung Taek Lee, Seoul (KR); Sang Jun Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 280 days.

(21) Appl. No.: 17/988,258

(22) Filed: Nov. 16, 2022

(65) Prior Publication Data

US 2023/0182712 A1 Jun. 15, 2023

(30) Foreign Application Priority Data

Dec. 15, 2021 (KR) ........................ 10-2021-0179264

(51) Int. Cl.
*B60W 20/10* (2016.01)
*B60W 10/02* (2006.01)
*B60W 10/08* (2006.01)

(52) U.S. Cl.
CPC ............ *B60W 20/10* (2013.01); *B60W 10/02* (2013.01); *B60W 10/08* (2013.01); *B60W 2510/0241* (2013.01); *B60W 2510/081* (2013.01); *B60W 2510/083* (2013.01); *B60W 2710/081* (2013.01); *B60W 2710/083* (2013.01)

(58) Field of Classification Search
CPC ...... B60W 20/00; B60W 10/00; B60W 10/08; B60W 2510/0241; B60W 2510/081; B60W 2510/083; B60W 2710/081; B60W 2710/083; B60W 2510/1005; B60W 2710/021; B60W 2710/0644; B60W 2510/0638; B60K 6/38; B60K 6/387; Y02T 10/62; B60Y 2200/92
See application file for complete search history.

(56) References Cited

U.S. PATENT DOCUMENTS 5,065,319 A * 11/1991 Iwatsuki ........... B60W 30/1819
701/101
7,510,504 B2 * 3/2009 Cullen .................. B60W 10/06
477/107

(Continued)

*Primary Examiner* — Aniss Chad
*Assistant Examiner* — Elizabeth J Slowik
(74) *Attorney, Agent, or Firm* — Fox Rothschild LLP

(57) ABSTRACT

Disclosed herein is a method of controlling a hybrid electric vehicle in which a torque converter is disposed between a motor and a transmission for driving the hybrid electric vehicle comprises, by a control unit, determining a driver demand torque and an output speed of the torque converter based on vehicle driving information, determining a target input speed of the torque converter from the determined output speed of the torque converter based on preset characteristic information of the torque converter and information on the determined driver demand torque, determining the determined target input speed of the torque converter as a target engine starting speed, and performing control to start an engine using torque of the motor when an engine-on mode is determined, and controlling and engine speed to the determined target engine starting speed after startup.

12 Claims, 7 Drawing Sheets

START

DETERMINE DRIVER DEMAND TORQUE AND TORQUE CONVERTER OUTPUT SPEED AT WHICH VEHICLE IS CURRENTLY TRAVELABLE — S1

DETERMINE TORQUE CONVERTER INPUT SPEED FROM TORQUE CONVERTER OUTPUT SPEED — S2

DETERMINE TORQUE CONVERTER INPUT TORQUE IN RESPONSE TO TORQUE CONVERTER INPUT SPEED — S3

DETERMINE TORQUE CONVERTER OUTPUT TORQUE IN RESPONSE TO TORQUE CONVERTER INPUT TORQUE — S4

DETERMINE TARGET OUTPUT TORQUE, TARGET INPUT TORQUE, TARGET INPUT SPEED OF TORQUE CONVERTER — S5

DETERMINE TARGET ENGINE STARTING SPEED — S6

DETERMINE TIMING OF DISENGAGEMENT AND ENGAGEMENT OF DAMPER CLUTCH — S7

CONTROL ENGINE START BY MOTOR — S8

END

(56)        References Cited

U.S. PATENT DOCUMENTS

| | | | | | |
|---|---|---|---|---|---|
| 9,333,974 | B1 * | 5/2016 | Gibson | | B60W 10/06 |
| 11,181,191 | B1 * | 11/2021 | Veeramurthy | | F16H 59/42 |
| 11,267,453 | B1 * | 3/2022 | Bolthouse | | B60W 30/1882 |
| 2002/0179351 | A1 * | 12/2002 | Shimabukuro | | B60K 6/36 |
| | | | | | 180/65.23 |
| 2003/0163235 | A1 * | 8/2003 | Tokura | | B60W 10/06 |
| | | | | | 701/67 |
| 2007/0114082 | A1 * | 5/2007 | Nozaki | | B60L 50/16 |
| | | | | | 180/65.6 |
| 2012/0172175 | A1 * | 7/2012 | Nedorezov | | B60W 10/026 |
| | | | | | 477/169 |
| 2014/0172253 | A1 * | 6/2014 | Palmer | | F16H 61/0213 |
| | | | | | 701/56 |
| 2015/0065297 | A1 * | 3/2015 | Hoshiba | | B60W 10/08 |
| | | | | | 180/65.265 |
| 2015/0133267 | A1 * | 5/2015 | Ito | | F16D 48/06 |
| | | | | | 477/169 |
| 2018/0015924 | A1 * | 1/2018 | Steffes | | F16H 61/12 |
| 2018/0180011 | A1 * | 6/2018 | Stalfors | | B60W 10/02 |
| 2019/0299975 | A1 * | 10/2019 | Eriksson | | B60W 10/023 |
| 2021/0171006 | A1 * | 6/2021 | Syed | | B60W 10/026 |
| 2021/0291807 | A1 * | 9/2021 | Hayasaka | | B60W 10/02 |
| 2022/0306083 | A1 * | 9/2022 | Fukuda | | B60W 30/192 |

* cited by examiner

TORQUE CONVERTER
INPUT TORQUE

TORQUE CONVERTER
INPUT SPEED
(MOTOR AND ENGINE SPEED)

TARGET TORQUE
CONVERTER
INPUT SPEED

DEMAND TORQUE

Engine Idle Speed Zone
(Engine Clutch LockUp/Slip)

TORQUE CONVERTER
OUTPUT SPEED
(TRANSMISSION INPUT SPEED)

METHOD OF CONTROLLING HYBRID ELECTRIC VEHICLE

CROSS-REFERENCE TO RELATED APPLICATION(S)

This application claims, under 35 U.S.C. § 119(a), the benefit of Korean Patent Application No. 10-2021-0179264 filed on Dec. 15, 2021, the disclosure of which is incorporated herein by reference in its entirety.

BACKGROUND

Technical Field

Embodiments of the present disclosure relate to a method of controlling a hybrid electric vehicle. More particularly, embodiments relate to a method of determining an optimal target operating point for a vehicle driving device in consideration of characteristics of a torque converter mounted on a hybrid electric vehicle without a hybrid starter and generator (HSG), which is a main starting device.

Background

A hybrid electric vehicle is a vehicle powered by an engine (e.g., an internal combustion engine) and a motor, as driving sources. A transmission mounted electric device (TMED)-type hybrid system is known as one of the powertrain types of hybrid electric vehicles.

In such a TMED-type hybrid system, an engine clutch is disposed between a plurality of driving devices (i.e., an engine and a motor) for driving a vehicle, and a transmission is connected to the output side of the motor. The vehicle is equipped with an inverter for actuating and controlling the motor, and the motor is connected to a main high-voltage battery within the vehicle through the inverter for charging and discharging.

When the motor is actuated, the inverter converts the direct-current (DC) current supplied from the battery into alternating-current (AC) current to apply the AC current to the motor through a power cable. On the other hand, when the motor is regenerated, the inverter converts the AC current generated by the motor into DC current to supply the DC current to the battery.

The vehicle is provided with a hybrid starter and generator (HSG) that is connected to the engine for transmission of power to start the engine or generate power by rotational force transmitted from the engine. Like the motor for driving the vehicle, the HSG is operable as both the motor and the generator, and is connected to the battery through the inverter for charging and discharging.

The hybrid electric vehicle may be configured to perform a regenerative mode for charging the battery by recovering vehicle kinetic energy as electric energy through motor power generation during inertial coasting or braking. It is essential for the hybrid electric vehicle to have a regenerative mode function in order to increase vehicle efficiency and improve fuel efficiency.

The hybrid electric vehicle may require proper power distribution between the engine and the motor to minimize fuel consumption and improve fuel efficiency. A process will be described in which a target operating point, an engine torque command (or engine speed command), and a motor torque command (or motor speed command) are determined in a TMED hybrid electric vehicle.

FIG. 1 is a block diagram illustrating a configuration of a control device to perform power control and shift control in a hybrid electric vehicle. As illustrated, the hybrid electric vehicle comprises a plurality of control units, 10 to 40, configured to perform cooperative control for the power control and the shift control of the vehicle.

First, a hybrid control unit (HCU) 10, which may be referred to as a top-level control unit, may be configured to determine a driver demand torque according to a driver's driving intention based on vehicle driving information such as, e.g., a driver's accelerator pedal input value (APS value) and a brake pedal input value (BPS value).

The hybrid control unit (HCU) 10 may be configured to determine an engine on/off mode for satisfying the driver demand torque, and may be configured to perform torque distribution to driving devices based on information on the determined driver demand torque and engine on/off mode.

In this case, the hybrid control unit 10 may be configured to determine, generate, and output an engine torque command (or engine speed command) and a motor torque command (or motor speed command) to satisfy the driver demand torque in response to a distribution ratio and a distribution torque profile for power distribution.

Then, an engine control unit (ECU) 20 and a motor control unit (MCU) 30 may be configured to receive the engine torque command (or engine speed command) and the motor torque command (or motor speed command), respectively, from the hybrid control unit 10, and control the torque (or speed) of the engine and the motor in response to the received respective torque commands (or speed commands).

As described above, the shift control may be performed together with the power control of the vehicle. A transmission control unit (TCU) 40 may be configured to determine a target shift range based on the information collected from the vehicle, and may be configured to control the operation of a transmission in order to enable the transmission to perform the shift to the target shift range.

The transmission control unit 40 may be configured to provide current shift state information, such as a target shift range, a shift class, and a shift phase, to the hybrid control unit 10, and the hybrid control unit 10 may be configured to perform torque intervention control or the like with reference to the shift state information.

When the power control and shift control of the hybrid electric vehicle are performed, the driver demand torque may be satisfied by "driver demand torque=motor torque× shift ratio×FGR" in the engine-off mode (EV mode), and the driver demand torque may be satisfied by "driver demand torque=(engine torque+motor torque)×shift ratio×FGR" in the engine-on mode (HEV mode). Here, "FGR" refers to the final gear ratio.

As illustrated in FIG. 2, a hybrid electric vehicle is known which may comprise a system equipped with a torque converter 4 between a motor 3 and a transmission 5, rather than an HSG as a main starting device (separate starter and generator).

Here, the transmission 5 may be an automatic transmission (AT). The torque converter 4 may be used as a vehicle starting device, and is typically provided with a damper clutch 4a.

As described above, when no HSG for starting an engine 1 is provided in the hybrid electric vehicle having the torque converter 4 mounted thereon, it may be necessary to use the motor 3 and the torque converter 4 to start the engine 1.

FIG. 2 illustrates the engine 1 and the motor 3, which are driving devices for driving the vehicle, an engine clutch 2 disposed between the engine 1 and the motor 3 to connect or disconnect power between the engine and the motor, the transmission 5 connected to the output side of the motor 3, and the torque converter 4 disposed between the motor 3 and the transmission 5.

FIG. 2 also illustrates an inverter 6 for actuating and controlling the motor 3, a battery 7 connected to the motor 3 through the inverter 6 for charging and discharging, and a low-voltage DC-DC converter (LDC) 8 for converting the high-voltage power of the battery 7 into low-voltage power to supply the low-voltage power to the vehicle.

In the hybrid electric vehicle illustrated in FIG. 2, the torque converter 4 may be configured to cause a target operating point to be changed. Hence, due to the performance characteristics of the torque converter, such as transmission efficiency, capacity, speed ratio, and transmission torque ratio, it may be necessary to reflect a change in the target operating point. Therefore, there may be a need for a method of determining an optimal target operating point, which reflects the performance characteristics of the torque converter.

The above information disclosed in this Background section is only for enhancement of understanding of the background of the disclosure and therefore it may contain information that does not form the existing technologies that is already known in this country to a person of ordinary skill in the art.

SUMMARY

The present disclosure has been made in an effort to solve the above-described problems associated with the existing technologies.

In one aspect, the present disclosure provides a method of determining an optimal target operating point for a vehicle driving device in consideration of characteristics of a torque converter mounted on a hybrid electric vehicle.

In another aspect, the present disclosure provides a method of determining a target operating point for starting an engine and of starting the engine using a motor, which is a driving device, and a torque converter mounted on a hybrid electric vehicle without a hybrid starter and generator (HSG), which is a main starting device.

The present disclosure is not limited to the above-mentioned aspects, and other aspects of the present disclosure will be clearly understood by those skilled in the art to which the present disclosure pertains from the following description.

In a preferred embodiment, there is provided a method of controlling a hybrid electric vehicle in which a torque converter is disposed between a motor and a transmission for driving the hybrid electric vehicle, which comprises, by a control unit, determining a driver demand torque and an output speed of the torque converter based on vehicle driving information obtained in real time while the vehicle travels, determining a target input speed of the torque converter from the determined output speed of the torque converter based on preset characteristic information of the torque converter and information on the determined driver demand torque, determining the determined target input speed of the torque converter as a target engine starting speed, and performing control to start an engine using torque of the motor when an engine-on mode is determined, and controlling and engine speed to the determined target engine starting speed after startup.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
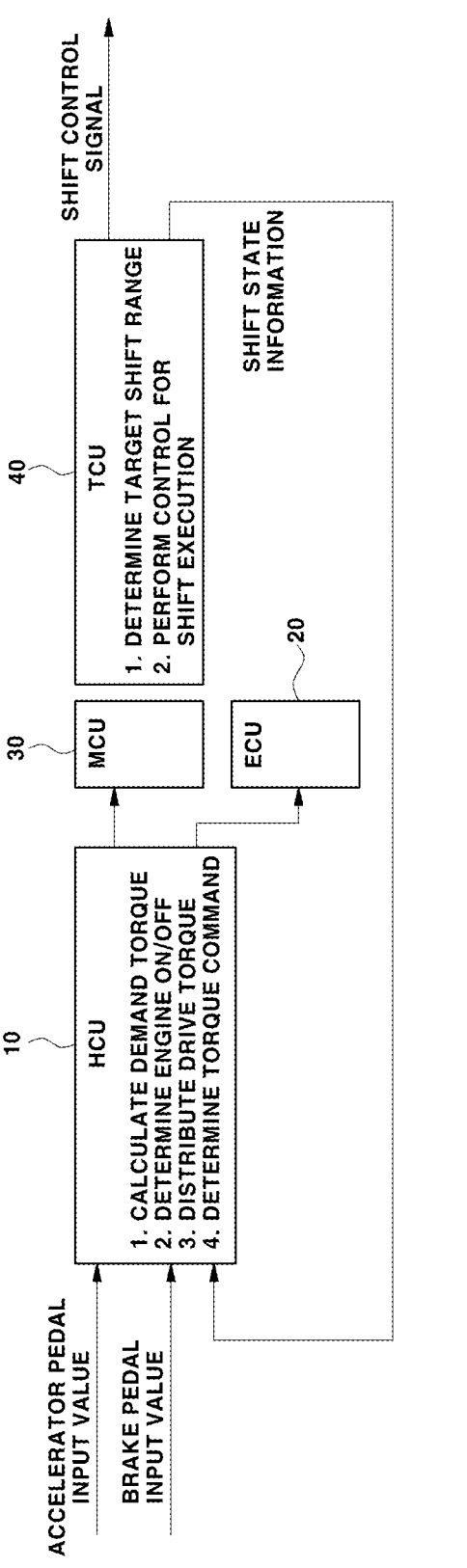
FIG. 1 is a block diagram illustrating a configuration of a control device configured to perform power control and shift control in a hybrid electric vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The specific structural or functional descriptions set forth herein are only provided for the purpose of describing the embodiments according to the concept of the present disclosure, and these embodiments may be implemented in different forms. The present disclosure should not be construed as being limited to the embodiments set forth herein, but it should be understood that the present disclosure includes all modifications, equivalents, or replacements that fall within the spirit and scope of the disclosure as defined in the following claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Terms such as "first" and/or "second" may be used herein to describe various elements of the present disclosure, but these elements should not be construed as being limited by the terms. Such terms will be used only for the purpose of differentiating one element from other elements of the present disclosure. For example, without departing from the scope and spirit of the present disclosure, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. On the other hand, it will be understood that when an element is referred to as being "directly coupled" or "directly connected" to another element, no intervening elements are present. Other expressions for explaining relationships between elements, for example, "between" and "immediately between" or "neighboring" and "directly neighboring" may also be interpreted likewise.

Like reference numerals refer to like components throughout the specification. The terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises/includes" and/or "comprising/including" when used in the specification, specify the presence of stated components, steps, motions, and/or elements, but do not preclude the presence or addition of one or more other components, steps, motions, and/or elements.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

The present disclosure relates to a method of controlling a hybrid electric vehicle, and provides a method of determining an optimal target operating point for a vehicle driving device by reflecting characteristics of a torque converter mounted on a hybrid electric vehicle.

In addition, the present disclosure provides a method of starting an engine using a motor, which is a driving device, and a torque converter in the hybrid electric vehicle with torque converter and no HSG, which is a main starting device.

Here, the target operating point refers to a target operating point of a driving device (i.e., an engine and a motor) for driving the vehicle, which may mean a target torque of the engine and the motor to satisfy a driver demand torque or a target speed of the engine and the motor. In the following description, the "motor" refers to a motor, which is a vehicle driving device, namely, a drive motor for driving the vehicle.

Figure 2:
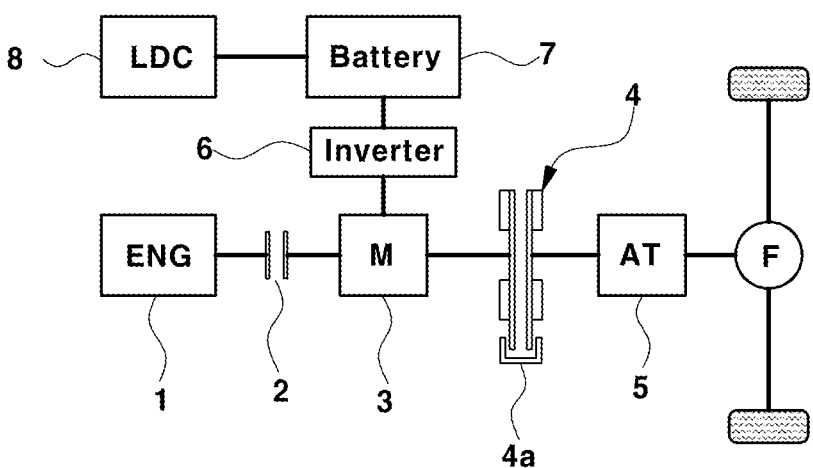
FIG. 2 is a diagram illustrating a configuration of a powertrain of a hybrid electric vehicle having a torque converter mounted thereon.
Figure 3:
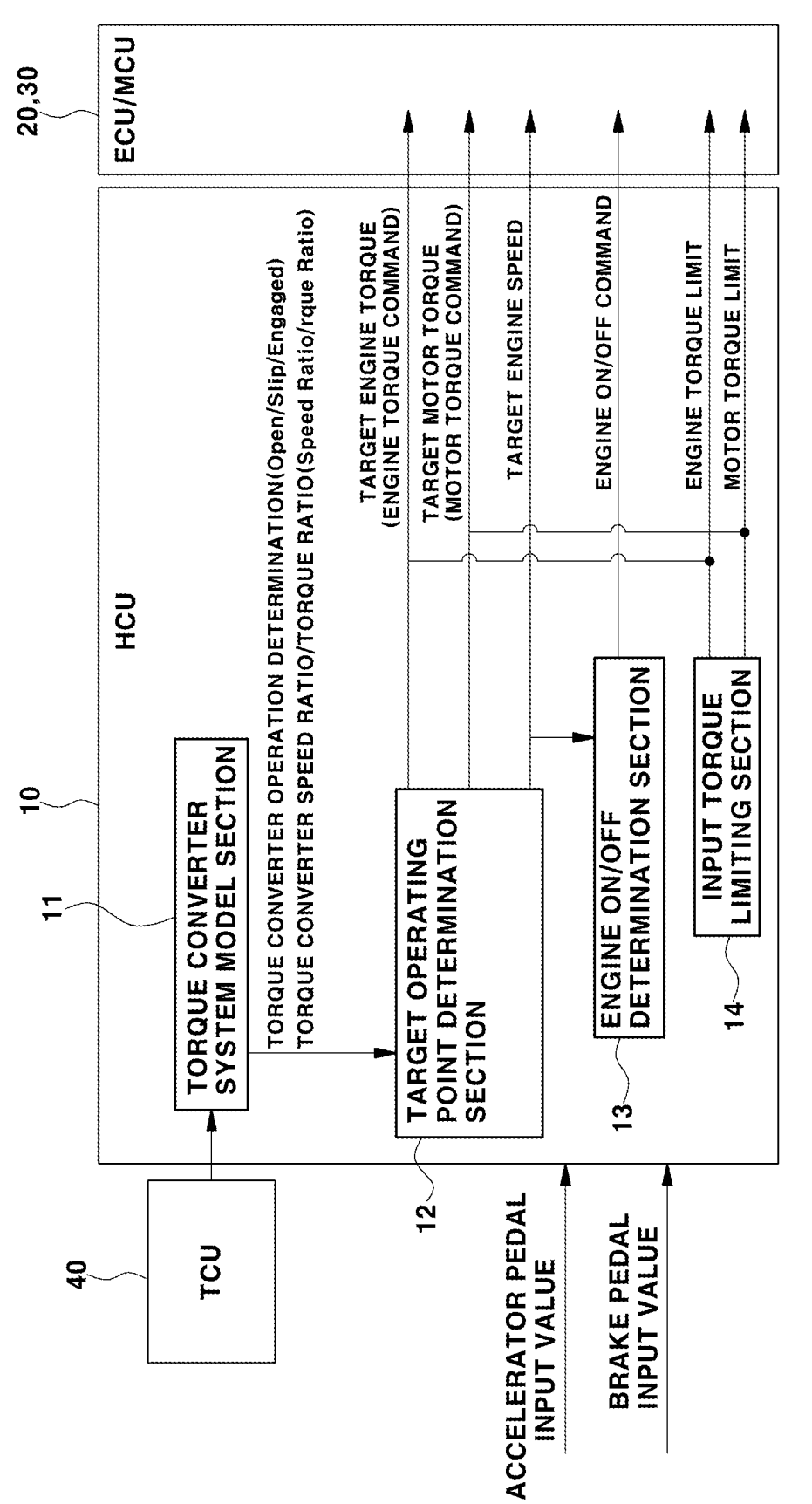
FIG. 3 is a block diagram illustrating a configuration of a control device of a hybrid electric vehicle according to the present disclosure.

FIG. 3 is a block diagram illustrating a configuration of a control device of the hybrid electric vehicle according to the present disclosure. In the present disclosure, the configuration of the powertrain and the hybrid system in the hybrid electric vehicle equipped with a torque converter 4 will be described below with reference to FIG. 2.

The process of controlling the hybrid electric vehicle according to the present disclosure may comprise a process of determining a target operating point which reflects characteristics of a torque converter 4 (e.g., current characteristics of the torque converter 4), and a process of starting an engine 1 by reflecting the characteristics of the torque converter 4. Here, the process of starting the engine 1 may comprise a process of using characteristic information of the torque converter 4 to change (correct) the target operating point.

In addition, the process of starting the engine 1 may comprise a process of determining a target engine starting speed (which is a target engine speed after starting during the target operating point), and a process of determining a timing of disengagement and engagement of a damper clutch 4a within the torque converter 4.

Furthermore, the process of starting the engine 1 may comprise a process of controlling engagement of an engine clutch 2, a process of controlling the engine 1 and the motor 3 to be driven in response to the finally determined target operating point (changed target operating point) at startup, and a process of controlling the operation of the damper clutch in response to the determined timing of disengagement and engagement of the damper clutch 4a.

In order to perform the process of controlling the hybrid electric vehicle including the process of starting the engine in the present disclosure, as illustrated in FIG. 3, a hybrid control unit (HCU) 10, an engine control unit (ECU) 20, a motor control unit (MCU) 30, and a transmission control unit (TCU) 40 perform cooperative control.

In the configuration of the control device illustrated in FIG. 3, the transmission control unit 40 may be configured to determine a target shift range using shift pattern information such as a shift schedule map based on drive wheel's wheel speed or vehicle speed information and driver's accelerator pedal input value (APS value) or driver demand torque information while the vehicle travels, and may be configured to perform control for changing the current shift range of the transmission 5 to the target shift stage.

The transmission control unit 40 transmits, to the hybrid control unit 10, current shift state information such as a target shift range, a shift class, and a shift phase. In addition, the transmission control unit 40 transmits, to the hybrid control unit 10, actual operating state information such as the current state of the torque converter 4.

The hybrid control unit 10 may comprise a torque converter system model section 11, a target operating point determination section 12, an engine on/off determination section 13, and an input torque limiting section 14.

In the hybrid control unit 10, the torque converter system model section 11 uses modeling information of a torque converter system to determine the operation of the torque converter 4, such as disengagement (opening), slip, and engagement (lock-up) of the damper clutch 4a within the torque converter 4, and provides the target operating point determination section 12 with performance and characteristic information of the torque converter, such as the speed ratio SR, torque ratio TR, and capacity factor Cf of the torque converter 4.

In more detail, the speed ratio SR of the torque converter 4 refers to a ratio between the input speed and the output speed of the torque converter, and the torque ratio TR of the torque converter 4 refers to a ratio between the input torque and the output torque of the torque converter.

In this case, the value of the speed ratio SR may be defined as a ratio value of the output speed to the input speed of the torque converter ("SR=output speed/input speed"). In addition, the value of the torque ratio TR may be defined as a ratio value of the output torque to the input torque of the torque converter ("TR=output torque/input torque").

Figure 5:
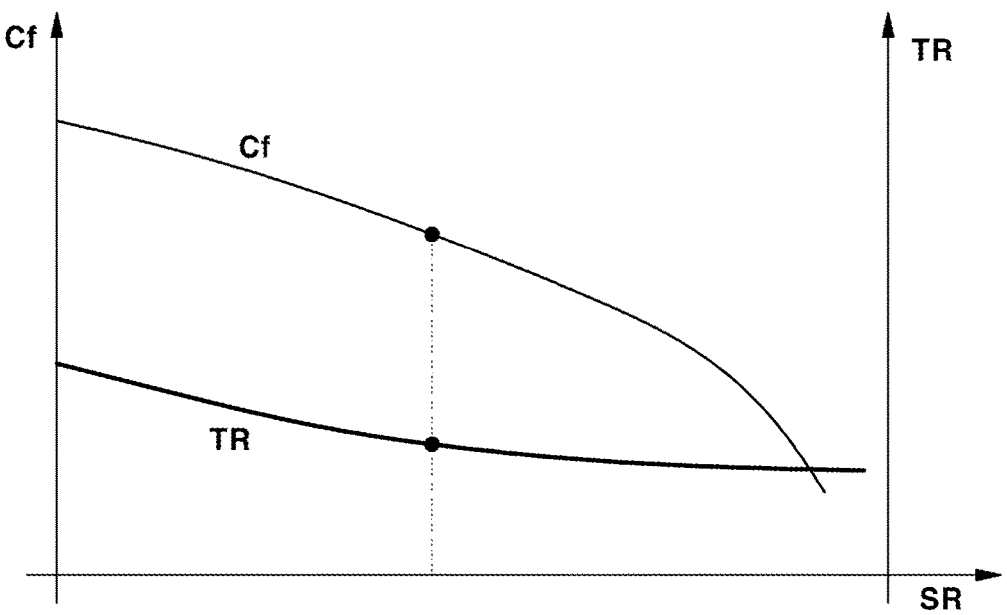
FIG. 5 is a graph illustrating an example of setting a speed ratio SR, a torque ratio TR, and a capacity factor Cf with respect to characteristic information of a torque converter in the present disclosure.

When the design of the torque converter mounted on the vehicle is completed, the capacity factor Cf of the torque converter is determined. The values as illustrated in FIG. 5 may be predetermined by the design. When the torque converter is designed, the values of the speed ratio SR, the torque ratio TR, and the capacity factor Cf may be set according to the input speed, the output speed, the input torque, and the output torque, which are the input/output operating conditions of the torque converter.

The values of the speed ratio SR, the torque ratio TR, and the capacity factor Cf of the torque converter are defined as design values, which may have a tendency as illustrated in FIG. 5. FIG. 5 illustrates an example in which the speed ratio SR, torque ratio TR, and capacity factor Cf of the torque converter 4 mounted on the vehicle are set to variable values, which will be described again later.

In general, the value of the capacity factor Cf of the torque converter may be a maximum value in the capacity of that torque converter. The input torque of the torque converter may be determined as a value obtained by multiplying the value of the capacity factor (Cf) by the square value of the input speed of the torque converter ("input torque=Cf×input speed×input speed").

Basically, the target operating point determination section 12 of the hybrid control unit 10 may be configured to determine a driver demand torque based on the vehicle driving information such as the accelerator pedal input value (APS value) and the brake pedal input value (BPS value) collected while the vehicle travels.

In addition, the target operating point determination section 12 uses the driver demand torque and the characteristic information of the torque converter to determine a final target operating point for the engine 1 and the motor 3.

The target operating point determination section 12 may be configured to determine a target engine torque, a target motor torque, a target engine speed (including a target engine starting speed, which is a target speed after starting the engine), a target motor speed, etc., for satisfying the driver demand torque in the process of determining the target operating point.

The target operating point determination section 12 generates commands corresponding to the finally determined target engine torque and target motor torque (i.e., an engine torque command and a motor torque command), and outputs them to the engine control unit 20 and the motor control unit 30.

The target operating point determination section 12 may be configured to generate the determined target engine speed (including the target engine starting speed) and the target motor speed in the form of a speed command, and output them to the engine control unit 20 and the motor control unit 30.

In more detail, in order to determine the target operating point, the target operating point determination section 12 may be configured to determine the output speed of the torque converter 4, at which the vehicle is currently travelable, and the driver demand torque based on the vehicle driving information collected in real time from the vehicle.

In this case, the target operating point determination section 12 may be configured to determine the driver demand torque, and also may be configured to determine the output speed of the torque converter 4, at which the vehicle is currently travelable, based on vehicle driving information corresponds to the wheel speed of the drive wheel detected by a wheel speed sensor (not shown) in the vehicle and gear ratio information corresponding to the current gear range of the transmission 5. Here, the gear ratio reflects the shift ratio of the transmission, and refers to a gear ratio between the output shaft of the torque converter 4 and the drive wheel.

Since the output side of the torque converter 4 is connected to the input side of the transmission 5, the output speed of the torque converter 4 is the input speed of the transmission 5. Determining the output speed of the torque converter may use the wheel speed detected by the wheel speed sensor as described above or the drive wheel's wheel speed obtained by conversion from the vehicle speed.

Figure 4:
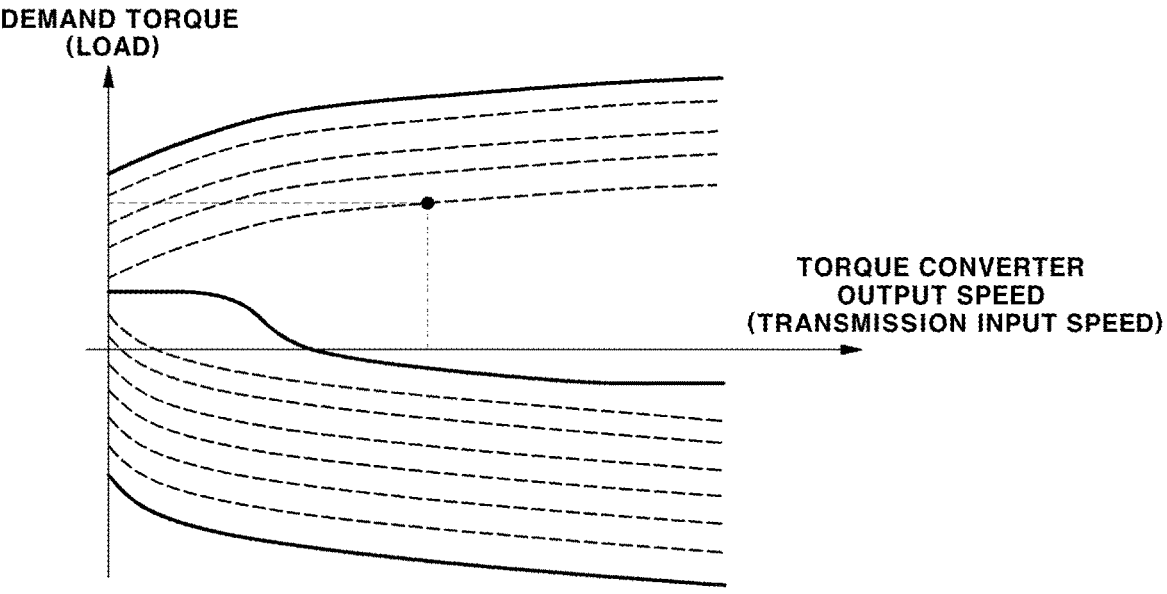
FIG. 4 is a diagram illustrating a driver demand torque and a torque converter output speed in the present disclosure.

FIG. 4 is a diagram illustrating the driver demand torque and the output speed of the torque converter.

When the output speed of the torque converter 4 is determined as described above, the target operating point determination section 12 may be configured to determine the input speed of the torque converter from the determined output speed of the torque converter based on the preset, input, and stored characteristic information of the torque converter. The input speed may be obtained as possible input speeds in the torque converter system based on the output speed of the torque converter at which the vehicle is currently travelable.

In the present disclosure, setting data as illustrated in FIG. 5 may be used as the characteristic information of the torque converter, which may be used to determine the target operating point while being input and stored in the target operating point determination section 12.

FIG. 5 is a graph illustrating an example in which the value of the speed ratio SR, the value of the torque ratio TR, and the value of the capacity factor Cf are set as the characteristic information of the torque converter in the present disclosure. FIG. 5 illustrates an example in which the capacity factor Cf and the torque ratio TR are set in response to the speed ratio SR, and is a diagram illustrating the relationship between the speed ratio SR and the capacity factor Cf and the relationship between the speed ratio SR and the torque ratio TR. It can be understood that the illustrated diagram is a preset performance curve of the torque converter.

According to the setting data indicated by the diagram of FIG. 5, the value of the capacity factor Cf and the value of the torque ratio TR are varied as the value of the speed ratio SR is changed. In addition, from the setting data of FIG. 5, it is possible to know the value of the capacity factor Cf and the value of the torque ratio TR corresponding to an arbitrary value of the speed ratio SR. In the present disclosure, the values of the speed ratio SR, the capacity factor Cf, and the torque ratio TR corresponding to the target operating point are determined as one of the values indicated by the diagram of FIG. 5.

In the present disclosure, the characteristic information of the torque converter may comprise the values of the speed ratio SR, the capacity factor Cf, and the torque ratio TR indicated by the diagram of FIG. 5, and the values of the speed ratio SR, the capacity factor Cf, and the torque ratio TR are variable values that change on the diagram.

After determining the output speed of the torque converter 4, the target operating point determination section 12 uses the characteristic information of the torque converter to determine a plurality of torque converter input speeds, input torques, and output torques, in consideration of characteristics of the torque converter, from the determined output speed of the torque converter.

That is, from the determined output speed of the torque converter, the input speed of the torque converter may be determined by the speed ratio SR of the characteristic information of the torque converter. In this case, all of the plurality of speed ratios SR set as variable values are used, and a plurality of input speed values satisfying the plurality of respective speed ratios are obtained from the output speed of the torque converter. From the output speed of the torque converter, each input speed value is obtained for all of the plurality of speed ratios SR.

Next, the target operating point determination section 12 may be configured to determine the input torque of the torque converter using the capacity factor Cf of the characteristic information of the torque converter from the input speed of the torque converter 4 determined as described above. The input torque may be also obtained as possible input torques in the torque converter system based on the input speed of the torque converter at which the vehicle is currently travelable.

In this case, all of the plurality of capacity factors Cf set as variable values are used, and input torque values satisfying the plurality of respective capacity factors may be obtained from each output speed of the torque converter. That is, from each input speed of the torque converter, a plurality of input torque values corresponding to the respective input speeds may be obtained for all of the plurality of capacity factors Cf.

Figure 6:
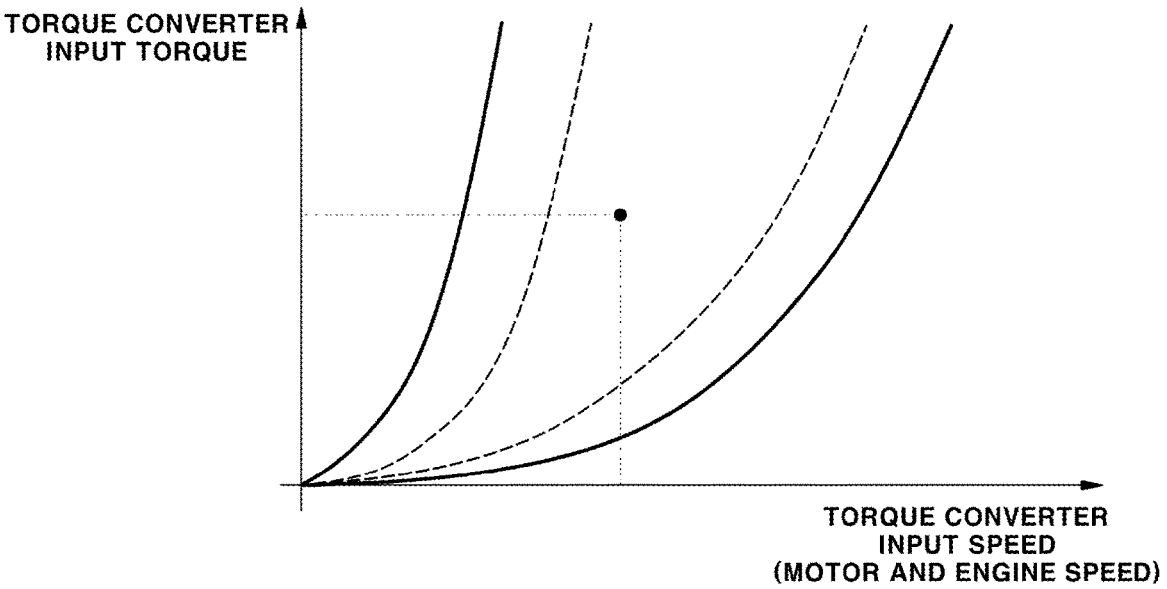
FIG. 6 is a graph illustrating a relationship between a torque converter input speed and a torque converter input torque according to the capacity factor Cf in the present disclosure.

FIG. 6 is a graph illustrating the relationship between the input speed and the input torque of the torque converter according to the capacity factor Cf in the present disclosure. In the target operating point determination section 12, all values of input torques corresponding to the input speed of the torque converter 4 are obtained, as illustrated in FIG. 6, for the capacity factor Cf illustrated in FIG. 5.

Since the input side of the torque converter 4 is connected to the output side of the motor 3, the input speed of the torque converter illustrated in FIG. 6 is the motor speed. If the engine speed is synchronized with the motor speed, the input speed of the torque converter, the motor speed, and the engine speed are all the same speed.

Next, the target operating point determination section 12 may be configured to determine the output torque of the torque converter using the torque ratio TR of the characteristic information of the torque converter from the input torque of the torque converter 4 determined as described above. The output torque may be also obtained as possible output torques in the torque converter system based on the input torque of the torque converter at which the vehicle is currently travelable.

In this case, all of the plurality of torque ratios TR set as variable values are used, and output torque values satisfying the plurality of respective torque ratios may be obtained from each input torque of the torque converter. That is, from each input torque of the torque converter, a plurality of output torque values corresponding to the respective input torques may be obtained for all of the plurality of torque ratios TR.

Accordingly, the target operating point determination section 12 may be configured to obtain a combination of input/output operating conditions of the torque converter corresponding to the respective speed ratio SR, capacity factor Cf, and torque ratio TR from the output speed of the torque converter at which the vehicle is currently travelable. That is, a combination of the plurality of torque converter input speeds, input torques, and output torques is obtained based on the output speed of the torque converter at which the vehicle is currently travelable.

Next, the target operating point determination section 12 may be configured to determine, as the target operating point of the torque converter, the output torque, the input torque, and the input speed in consideration of the current torque converter characteristics while satisfying the determined driver demand torque, among the determined plurality of output torques, input torques, and input speeds.

In this case, the target operating point determination section 12 compares the driver demand torque with the plurality of torque converter output torques to determine the output torque having the same value as the driver demand torque as the target output torque of the torque converter in consideration of the current torque converter characteristics.

In addition, the target operating point determination section 12 may be configured to determine, as the target input torque and target input speed of the torque converter, the input torque and the input speed in consideration of the current torque converter characteristics with respect to the output torque having the same value as the driver demand torque among the plurality of torque converter input torques and input speeds, respectively.

That is, the output torque having the same value as the driver demand torque among the determined plurality of output torques, and the input torque and input speed combined with the output torque are determined as the respective target output torque, target input torque, and target input speed of the torque converter.

In this case, the target operating point may be a combination that not only comprises the target output torque, the target input torque, and the target input speed of the torque converter, but also comprises the speed ratio SR, the capacity factor Cf, and the torque ratio TR corresponding thereto.

Figure 7:
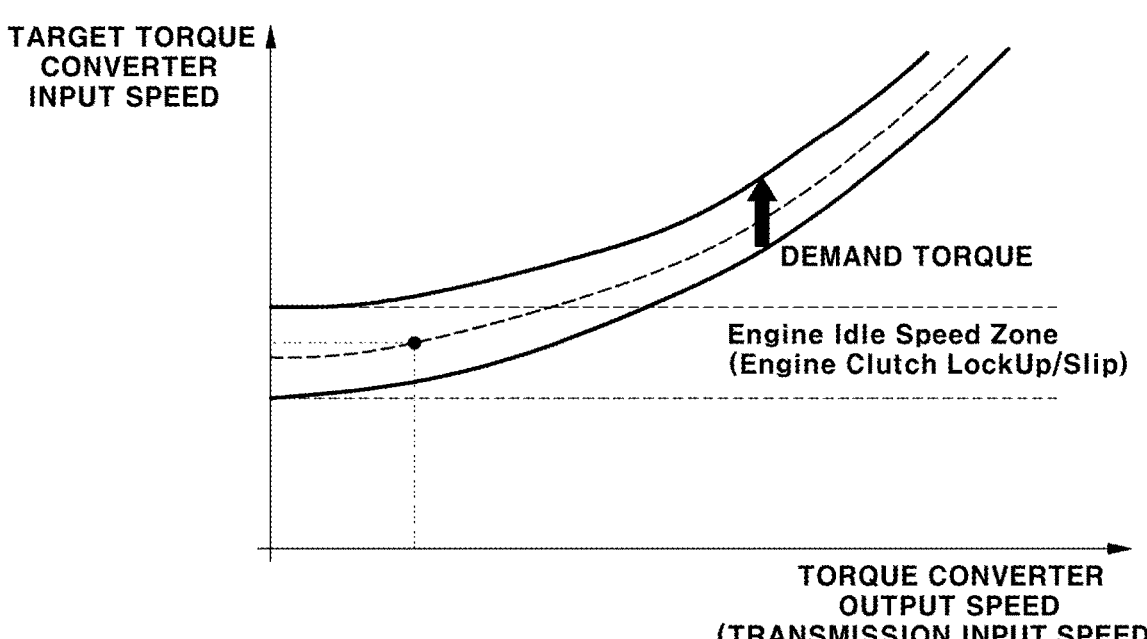
FIG. 7 is a graph illustrating a torque converter output speed and a target torque converter input speed in the present disclosure.

FIG. 7 is a graph illustrating the output speed and the target input speed of the torque converter in the present disclosure.

The target operating point determination section 12 may be configured to determine the determined target input speed of the torque converter as the target engine starting speed. The target engine starting speed may be determined in a zone equal to or greater than the minimum engine idle speed, and the determined target engine starting speed is transmitted to the engine on/off determination section 13. The target engine starting speed refers to a target engine speed after the engine is started.

The engine on/off determination section 13 may be configured to determine that the engine is turned on when a known engine starting condition is satisfied, and the hybrid control unit (HCU) 10 may be configured to perform engine clutch engagement control so that the engine clutch 2 is engageable to start the engine 1.

The hybrid control unit 10 disengages the damper clutch 4a within the torque converter 4 through cooperative control with the transmission control unit (TCU) 40 to start the engine 1, and attempts to start the engine by the motor 3 through cooperative control with the engine control unit (ECU) 20 and the motor control unit (MCU) 30. In this case, the motor speed and the motor torque are increased to start the engine.

In the process of starting the engine, the motor torque (the starting torque by the motor) is transmitted to the engine 1 through the engine clutch 2, and the engine speed is increased by the motor torque transmitted from the motor 3 through the engine clutch 2 to the engine 1. As a result, when the torque blending of the engine torque and the motor torque is performed after the engine speed is synchronized with the motor speed, the engine start is completed.

If the control for starting the engine begins when the vehicle coasts with the engine clutch 2 engaged and the damper clutch 4a engaged, the motor is used after disengagement of the damper clutch 4a in order to make an attempt to start the engine as described above.

In addition, the motor speed and the engine speed after starting the engine are controlled at a predetermined target speed, namely, at a target engine starting speed. After starting the engine, the damper clutch 4a may be re-engaged by cooperative control between the hybrid control unit 10 and the transmission control unit 40 according to the vehicle driving situation.

As described above, the control for disengaging the damper clutch 4a within the torque converter 4 is performed to start the engine, and the damper clutch 4a is re-engaged after starting the engine. The timing of engagement and disengagement of the damper clutch may be determined in response to the determined target input speed of the torque converter.

In order to determine the timing of engagement and disengagement of the damper clutch 4a, the target speed for engaging and disengaging the damper clutch may be determined as a target input speed of the torque converter.

That is, after controlling the motor speed to the determined target input speed of the torque converter for starting the engine, the damper clutch 4a may be disengaged when the motor speed is the target input speed of the torque converter, which is a target damper clutch disengagement speed, and the motor speed and the motor torque (starting torque) are then increased.

In addition, after starting the engine 1, the motor speed is decreased again. After starting the engine, the damper clutch 4a may be re-engaged when the synchronized motor speed and engine speed reach a predetermined target engine speed, in particular, the target torque converter input speed (target engine starting speed), which is a target damper clutch engagement speed.

In the configuration of the control device illustrated in FIG. 3, the engine control unit 20 and the motor control unit 30 control the operation of the engine 1 and the motor 3 in response to the engine torque command (or engine speed command) and the motor torque command (or motor speed command) output from the target operating point determination section 12 of the hybrid control unit 10.

The engine on/off determination section 13 of the hybrid control unit 10 may be configured to determine an engine-on mode or an engine-off mode based on the information such as the target engine speed, and outputs, to the engine control unit 30, an engine-on command or an engine-off command for turning on or off the engine 1.

Then, the engine control unit 20 may be configured to control the engine to be turned on or off in response to the engine-on command or the engine-off command output from the engine on/off determination section 13 of the hybrid control unit 10.

In addition, the input torque limiting section 14 of the hybrid control unit 10 may be configured to determine whether a torque limit is required based on the vehicle driving information, and may be configured to perform the torque limit to limit the engine torque and the motor torque to a torque limit value determined according to the vehicle driving situation.

In this case, the input torque limiting section 14 of the hybrid control unit 10 may be configured to receive the target engine torque and the target motor torque determined by the target operating point determination section 12, and may be configured to perform a control for limiting the input target engine torque and target motor torque to the torque limit value when the torque limit is required.

The input torque limiting section 14 of the hybrid control unit 10 outputs, to the engine control unit 20 and the motor control unit 30, commands corresponding to the target engine torque and the target motor torque to which the torque limit is applied, namely, the final engine torque command and motor torque command. Then, the engine control unit 20 and the motor control unit 30 control the operation of the engine 1 and the motor 3 in response to the engine torque command and the motor torque command output from the input torque limiting section 14 of the hybrid control unit 10.

As described above, in order to perform the control process of the hybrid electric vehicle according to the present disclosure, the plurality of control units provided in the vehicle may be configured to perform cooperative control. However, the control process of the hybrid electric vehicle according to the present disclosure may also be performed by a single integrated control element instead of the plurality of control units.

The plurality of control units and the single integrated control element may be collectively referred to as a control unit, and the control process of the present disclosure to be described later may be performed by such a control unit.

The control unit to be described later herein may collectively refer to a plurality of control units for performing cooperative control in the present disclosure, namely, the hybrid control unit, the engine control unit, the motor control unit, and the transmission control unit, or may refer to the single control element.

Figure 8:
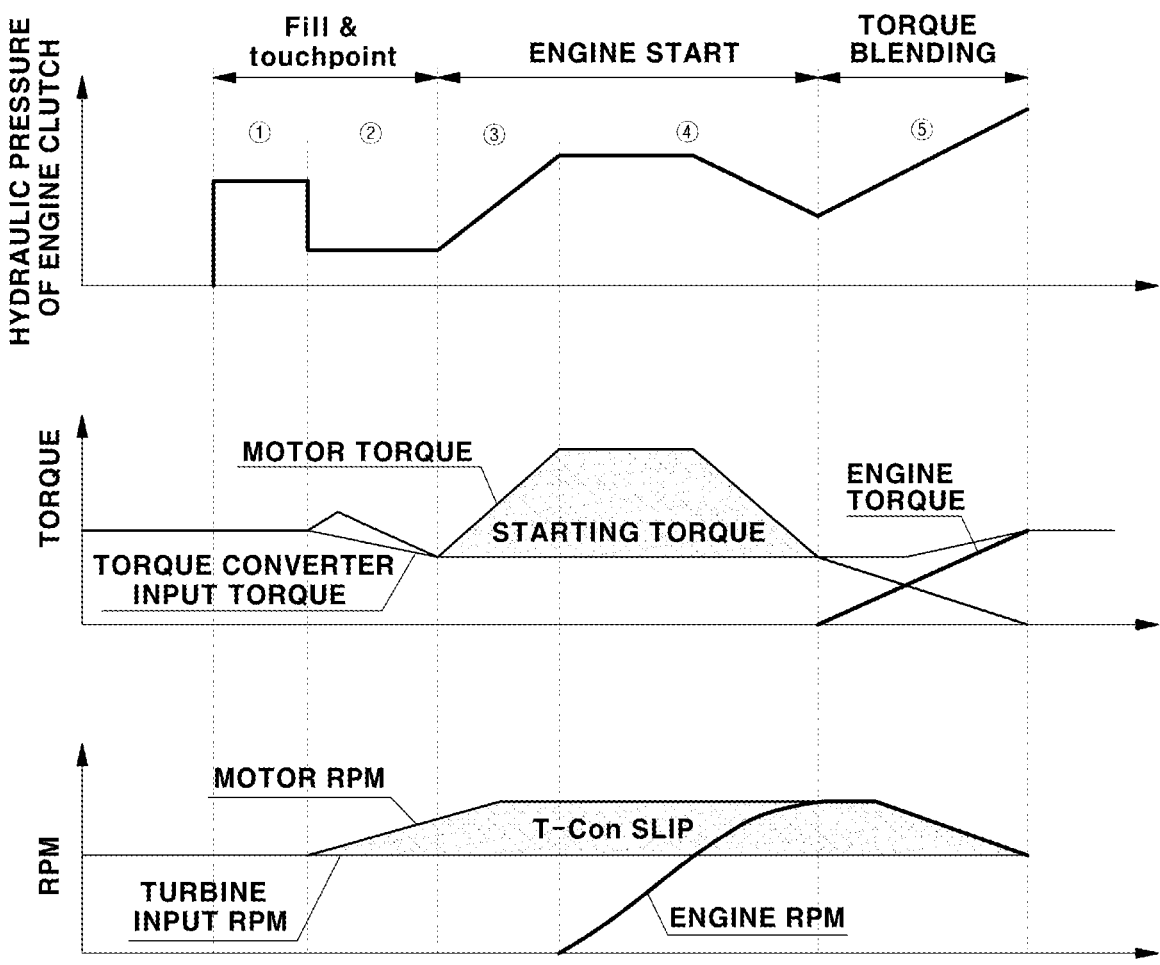
FIG. 8 is a diagram illustrating a control state when an engine is started in the present disclosure.

FIG. 8 is a view illustrating a control state when the engine is started in the present disclosure. When the engine-on mode is determined, the control unit may be configured to perform a known control process for engaging the engine clutch 2 to start the engine 1 by the motor 3.

That is, the control allows the fluid pipe of the engine clutch 2 to be filled with a working fluid ((①)), and releases the hydraulic pressure of the working fluid (the hydraulic pressure of the engine clutch) when the engine clutch 2 reaches a touchpoint ((②)). The control unit disengages the damper clutch 4a when the motor speed is a target torque converter input speed, which is a target speed for disengaging the damper clutch.

Then, the control unit may be configured to apply the hydraulic pressure of the working fluid again while increasing the motor torque to start the engine ((③)), and may be configured to control the torque converter 4 to a slip state while increasing the motor torque to start the engine ("T-Con slip").

Then, the control unit allows the motor torque (starting torque by the motor) to be transmitted to the engine 1 through the engine clutch 2, in which case the engine 1 is started by the motor torque to increase the engine speed. When the engine speed (rpm) increases to some extent, the control unit decreases the hydraulic pressure of the engine clutch 2 and the motor torque again ((④)).

Then, after the motor speed (rpm) is synchronized with the engine speed, the control unit increases the hydraulic pressure of the engine clutch again in the section of torque blending to complete the engagement of the engine clutch 2. In this case, the control unit increases the engine torque while decreasing the motor torque ((⑤)).

The start of the engine 1 to be completed through this process, and the control unit allows the damper clutch 4a of the torque converter 4 to be re-engaged while the engine clutch 2 is engaged after the engine 1 is started.

In this case, the control unit may be configured to decrease the motor speed, and may be configured to disengage the damper clutch 4a when the motor speed reaches the target torque converter input speed, which is a target speed for disengaging the damper clutch. With the damper clutch 4 engaged, the sum of the engine torque and the motor torque is the input torque of the torque converter.

Figure 9:
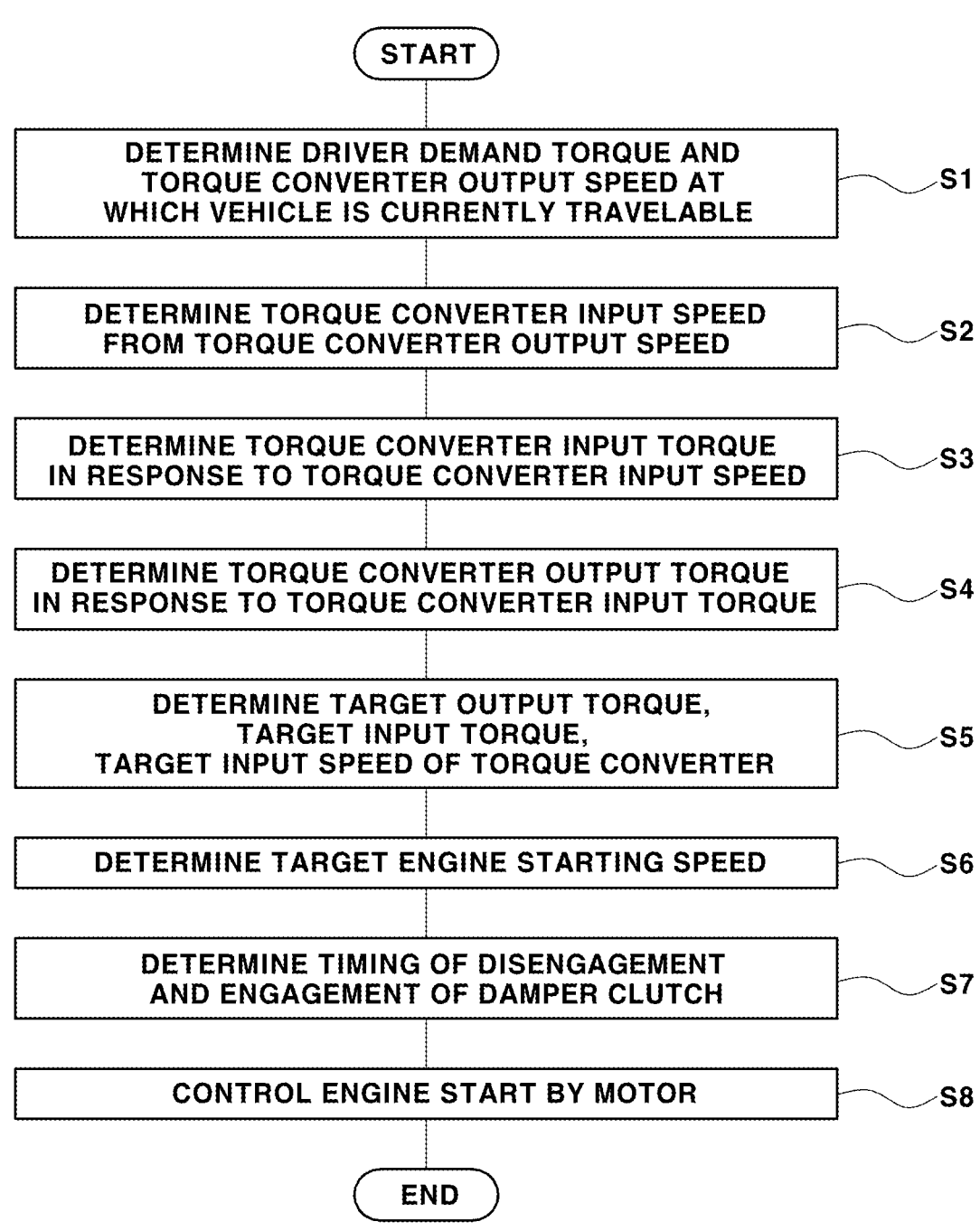
FIG. 9 is a flowchart illustrating a process of controlling a hybrid electric vehicle according to an exemplary embodiment of present disclosure.

FIG. 9 is a flowchart illustrating a process of controlling a hybrid electric vehicle according to an exemplary embodiment of present disclosure.

The control process will be described with reference to FIG. 9. The control unit may be configured to determine a driver demand torque based on vehicle driving information collected while the vehicle travels (S1). Here, the vehicle driving information may include information detected by a sensor.

Specifically, the vehicle driving information may include a driver's accelerator pedal input value (APS value) detected by an accelerator position sensor (APS), and a brake pedal input value (BPS value) detected by a brake pedal position sensor (BPS).

The control unit may be configured to determine the output speed of the torque converter 4, at which the vehicle is currently travelable, based on the vehicle driving information (S1). Here, the vehicle driving information used to determine the output speed of the torque converter may include gear ratio information corresponding to a wheel speed of a drive wheel and a current shift range of a transmission.

After the output speed of the torque converter 4 is determined as described above, the control unit may be configured to determine the input speed of the torque converter from the output speed of the torque converter by the following Equation 1 (S2), and then may be configured to determine the input torque of the torque converter in response to the input speed of the torque converter by the following Equation 2 (S3). The control unit may be configured to determine the output torque of the torque converter in response to the input torque of the torque converter by the following Equation 3 (S4).

Next, the control unit compares the driver demand torque with the output torque of the torque converter to determine, as the target output torque of the torque converter, an output torque having the same value as the driver demand torque, and then may be configured to determine an input torque and an input speed corresponding to the output torque having the same value as the driver demand torque as the respective target input torque and target input speed of the torque converter (S5).

$$\left(\begin{array}{c}\text{torque converter}\\ \text{input speed}\end{array}\right) = \left(\frac{1}{SR}\right) \times \left(\begin{array}{c}\text{torque concerter}\\ \text{output speed}\end{array}\right) \qquad \text{Equation 1}$$

$$\left(\begin{array}{c}\text{torque converter}\\ \text{input tongue}\end{array}\right) = Cf \times W \times W \qquad \text{Equation 2}$$

$$\left(\begin{array}{c}\text{target torque converter}\\ \text{ouput torque}\end{array}\right) = \left(\frac{1}{TR}\right) \times \left(\begin{array}{c}\text{target torque converter}\\ \text{input torque}\end{array}\right) \qquad \text{Equation 3}$$

Target torque converter output torque=(1/TR)×target torque converter input torque In Equation 1, "SR" refers to the speed ratio of the torque converter. In Equation 2, "Cf" refers to the capacity factor of the torque converter and W refers to the input speed of the torque converter. In Equation 3, "TR" refers to the torque ratio of the torque converter.

When the target input speed of the torque converter is determined as described above, the control unit may be configured to determine the determined target input speed of the torque converter as a target engine starting speed (S6), and may be configured to determine a timing of disengagement and engagement of the damper clutch (S7).

When it is determined that the engine is turned on with the engine turned off, the control unit may be configured to control the damper clutch 4a to be disengaged when the motor speed is a target torque converter input speed, which is a target damper clutch disengagement speed, to start the engine. The control unit may be configured to begin control for engaging the engine clutch 2 in the slip state of the torque converter 4, and may be configured to perform a control process for starting the engine by the motor 3 (S8).

In this case, the motor speed and the motor torque are increased to start the engine, and the engine speed is increased to the motor speed (target engine starting speed) by the motor torque transmitted through the engine clutch 3.

When the engine speed is synchronized with the motor speed, the hydraulic pressure of the engine clutch 2 is raised to a target engagement hydraulic pressure to complete the engagement of the engine clutch and the engine start. After the engine start is completed, the motor speed and the engine speed are controlled so as to be the torque converter input speed, which is the target engine starting speed.

After the engine start is completed, the damper clutch 4a is re-engaged when the motor speed reaches a target torque converter input speed, which is a target damper clutch engagement speed.

According to the method of controlling a hybrid electric vehicle of the present disclosure, it is possible to determine an optimal target operating point in consideration of the characteristics of the torque converter mounted on the hybrid electric vehicle. In addition, in the hybrid electric vehicle with the torque converter and no HSG, which is a main starting device, it is possible to start the engine using the motor, which is a driving device, and the torque converter.

Although the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A method of controlling a hybrid electric vehicle with a torque converter disposed between a motor for driving the hybrid electric vehicle and a transmission, and an engine clutch disposed between an engine and the motor, the method comprising:

by a control unit:

determining a driver demand torque and an output speed of the torque converter based on vehicle driving information obtained in real time while a vehicle travels;

determining a target output torque of the torque converter from a plurality of output torques, the target output torque having a same value as the driver demand torque;

determining a target input speed and a target input torque of the torque converter corresponding to the target output torque;

determining, before starting the engine, the target input speed of the torque converter from the output speed of the torque converter based on preset characteristic information of the torque converter and information on the driver demand torque, the preset characteristic information including speed ratio (SR), torque ratio (TR), and capacity factor (Cf) of the torque converter;

determining the target input speed of the torque converter as a target engine starting speed; and performing control to:

start the engine using torque of the motor transmitted through the engine clutch when entering an engine-on mode; and once the engine has started, controlling an engine speed to the target engine starting speed.

2. The method according to claim 1, wherein the determining the output speed of the torque converter further comprises:

determining the output speed of the torque converter based on gear ratio information corresponding to a wheel speed of a drive wheel and a current shift range of the transmission as the vehicle driving information.

3. The method according to claim 1, wherein the determining the target input speed of the torque converter further comprises:

determining a plurality of torque converter input speeds, input torques, and output torques in consideration of characteristics of the torque converter, from the output speed of the torque converter, based on the preset characteristic information of the torque converter; and determining, the target output torque, the target input torque, the target input speed of the torque converter, an output torque, an input torque, and an input speed in consideration of current characteristics of the torque converter while satisfying the driver demand torque among the plurality of torque converter input speeds, input torques, and output torques.

4. The method according to claim 3, wherein the determining the plurality of torque converter input speeds, input torques, and output torques comprises:

using information on the speed ratio, which is a ratio between the input speed and the output speed of the torque converter in the preset characteristic information of the torque converter to determine a plurality of torque converter input speeds satisfying the speed ratio from the output speed of the torque converter;

using information on the capacity factor of the torque converter in the preset characteristic information of the torque converter to determine a plurality of torque converter input torques in response to the capacity factor from the plurality of torque converter input speeds; and using information on the torque ratio, which is a ratio between the input torque and the output torque of the torque converter in the preset characteristic information of the torque converter to determine a plurality of torque converter output torques satisfying the torque ratio from the input torque of the torque converter.

5. The method according to claim 4, wherein the determining the target output torque, the target input torque, and the target input speed further comprises:

determining, as the target output torque of the torque converter in consideration of the current characteristics of the torque converter, a torque converter output torque having a same value as the driver demand torque among the plurality of torque converter output torques.

6. The method according to claim 5, further comprising, by the control unit:

determining, as the target input torque and the target input speed of the torque converter, an input torque and an input speed in consideration of the current characteristics of the torque converter with respect to a torque converter output torque having a same value as the driver demand torque among the plurality of torque converter input torques and input speeds.

7. The method according to claim 4, wherein:

the speed ratio, the capacity factor, and the torque ratio of the characteristic information of the torque converter are preset design value information preset as variable values for the torque converter, wherein the torque converter is mounted on the vehicle; and the capacity factor and the torque ratio of the characteristic information of the torque converter are set as values that vary with the speed ratio.

8. The method according to claim 1, further comprising:

determining, by the control unit, a target speed for disengaging a damper clutch within the torque converter and a target speed for engaging the damper clutch in response to the target input speed of the torque converter; and performing, by the control unit, control for disengaging the damper clutch when a motor speed is a target speed for disengaging the damper clutch when performing the control to start the engine.

9. The method according to claim 8, further comprising:

performing, by the control unit, control for engaging the damper clutch when the motor speed and the engine speed reach a target speed for engaging the damper clutch after the engine is started.

10. The method according to claim 8, wherein the determining the target speed for disengaging the damper clutch and the target speed for engaging the damper clutch further comprises:

determining the target input speed of the torque converter.

11. The method according to claim 8, further comprising, by the control unit:

performing control for engaging an engine clutch between the engine and the motor when performing the control to start the engine; and controlling the motor speed and the engine speed to the target engine starting speed, which is a target speed after the engine starts, after the engine is rotated by the torque of the motor in a slip state of the damper clutch so that the motor speed is synchronized with the engine speed.

12. A method of controlling a hybrid electric vehicle with a torque converter disposed between a motor for driving the hybrid electric vehicle and a transmission, and an engine clutch disposed between an engine and the motor, the method comprising:

by a control unit:

determining a driver demand torque and an output speed of the torque converter based on vehicle driving information obtained in real time while a vehicle travels;

determining a target output torque of the torque converter from a plurality of output torques, the target output torque having a same value as the driver demand torque;

determining a target input speed and a target input torque of the torque converter corresponding to the target output torque;

determining, before starting the engine, the target input speed of the torque converter from the output speed of the torque converter based on preset characteristic information of the torque converter and information on the driver demand torque, the preset characteristic information including speed ratio (SR), torque ratio (TR), and capacity factor (Cf) of the torque converter;

determining the target input speed of the torque converter as a target engine starting speed; and performing control to:

start the engine using torque of the motor transmitted through the engine clutch when entering an engine-on mode; and once the engine has started, controlling an engine speed to the target engine starting speed, wherein a combination of input/output operating conditions of the torque converter corresponding to the speed ratio (SR), the torque ratio (TR), and the capacity factor (Cf) of the torque converter are obtained from the output speed of the torque converter at which the vehicle travels.

* * * * *